United States Patent
Dar et al.

(10) Patent No.: US 12,124,714 B2
(45) Date of Patent: Oct. 22, 2024

(54) DATA STORAGE SYSTEM WITH SELF TUNING BASED ON CLUSTER ANALYSIS OF WORKLOAD FEATURES

(71) Applicant: Dell Products L.P., Round Rock, TX (US)

(72) Inventors: Shaul Dar, Petach Tikva (IL); Paras Pandya, Anand (IN); Vamsi K. Vankamamidi, Hopkinton, MA (US); Owen Martin, Hopedale, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/869,002

(22) Filed: Jul. 20, 2022

(65) Prior Publication Data

US 2024/0028225 A1     Jan. 25, 2024

(51) Int. Cl.
  *G06F 3/06*     (2006.01)
(52) U.S. Cl.
  CPC .......... *G06F 3/0631* (2013.01); *G06F 3/0604* (2013.01); *G06F 3/0635* (2013.01); *G06F 3/067* (2013.01)
(58) Field of Classification Search
  CPC .... G06F 3/0631; G06F 3/0604; G06F 3/0635; G06F 3/067; G06F 3/0644; G06F 3/0653
  See application file for complete search history.

(56) References Cited

U.S. PATENT DOCUMENTS

| | | | |
|---|---|---|---|
| 7,603,340 B2 | 10/2009 | Ngai et al. | |
| 7,774,312 B2 | 8/2010 | Ngai et al. | |
| 11,137,926 B1* | 10/2021 | Pendharkar | G06F 3/0611 |
| 11,386,058 B2 | 7/2022 | Hung et al. | |
| 2016/0203145 A1* | 7/2016 | Haviv | G06F 3/0685 707/694 |
| 2018/0074724 A1* | 3/2018 | Tremblay | G06F 3/0689 |
| 2018/0218038 A1 | 8/2018 | Katahira et al. | |
| 2019/0042386 A1* | 2/2019 | Barczak | G06F 3/0632 |
| 2020/0034077 A1* | 1/2020 | Haravu | G06F 3/067 |
| 2020/0296182 A1* | 9/2020 | Khosrowpour | H04L 67/303 |
| 2020/0393981 A1* | 12/2020 | Dutta | G06N 20/00 |

(Continued)

OTHER PUBLICATIONS

Seo, Bumjoon, Sooyong Kang, Jongmoo Choi, Jaehyuk Cha, Youjip Won, and Sungroh Yoon. "IO workload characterization revisited: A data-mining approach." IEEE Transactions on Computers 63, No. 12 (2013): 3026-3038.*

(Continued)

*Primary Examiner* — Tracy A Warren
(74) *Attorney, Agent, or Firm* — BainwoodHuang

(57) ABSTRACT

A data storage system includes a tuner that obtains data samples for data storage operations of workloads and calculates feature measures for a set of features of the data storage operations over aggregation intervals of an operating period. It further (1) applies a cluster analysis to the feature measures to define a set of clusters, and assigns the feature measures to the clusters, and (2) applies a classification analysis to the feature measures labelled by their clusters to identify dominating features of each cluster, and generates workload profiles for the clusters based on the dominating features, and then automatically adjusts configurable processing mechanisms (e.g., caching or tiering) based on the workload profiles and performance or efficiency goals.

23 Claims, 4 Drawing Sheets

(56) References Cited

U.S. PATENT DOCUMENTS

| | | | | |
|---|---|---|---|---|
| 2021/0141738 A1* | 5/2021 | Barbalho | | G06F 3/0688 |
| 2022/0398021 A1* | 12/2022 | Dutta | | G06N 20/00 |
| 2022/0405299 A1* | 12/2022 | Leung | | G06Q 10/10 |
| 2023/0064460 A1* | 3/2023 | Allen | | G06N 20/00 |
| 2023/0112096 A1* | 4/2023 | Choi | | G06F 16/285 |
| | | | | 707/737 |

OTHER PUBLICATIONS

Khanna, Rahul, Mrittika Ganguli, Ananth Narayan, R. Abhiram, and Piyush Gupta. "Autonomic characterization of workloads using workload fingerprinting." In 2014 IEEE international conference on cloud computing in emerging markets (CCEM), pp. 1-8. IEEE, 2014.*

Daradkeh, Tariq, Anjali Agarwal, Marzia Zaman, and Nishith Goel. "Dynamic k-means clustering of workload and cloud resource configuration for cloud elastic model." IEEE Access 8 (2020): 219430-219446.*

Bang, Jiwoo, Chungyong Kim, Kesheng Wu, Alex Sim, Suren Byna, Sunggon Kim, and Hyeonsang Eom. "HPC workload characterization using feature selection and clustering." In Proceedings of the 3rd International Workshop on Systems and Network Telemetry and Analytics, pp. 33-40. 2020.*

* cited by examiner bet# DATA STORAGE SYSTEM WITH SELF TUNING BASED ON CLUSTER ANALYSIS OF WORKLOAD FEATURES

BACKGROUND

The invention is related to the field of data storage systems, and in particular to data storage systems employing regular self-monitoring and self-adjustment of operating parameters for goals such as improved performance or efficiency.

SUMMARY

A method is disclosed of operating a data storage system having configurable processing mechanisms for processing data storage operations of a set of workloads. The method includes obtaining data samples for the data storage operations and calculating feature measures for a predefined set of features of the data storage operations over a succession of aggregation intervals of an operating period. During the operating period, (1) a cluster analysis is applied to the feature measures to define a set of clusters, and the feature measures are assigned to the clusters, and (2) a classification analysis is applied to the feature measures labelled by their respective clusters to identify one or more dominating features of each of the clusters, and workload profiles are generated for the clusters based on the dominating features thereof. One or more of the configurable processing mechanisms are adjusted based on the workload profiles and one or more performance or efficiency goals for the processing of the workloads by the data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 4 is a plot of total error measure versus number of clusters, used to

DETAILED DESCRIPTION

Overview

Storage system vendors such as DellEMC strive to maximize system performance while controlling system cost. The cost of storage media such as dynamic random-access memory (DRAM—main memory and volatile cache memory), solid-state drive (SSD) and hard disk drive (HDD) is a major driver of storage system cost, and therefore being able to improve allocation and usage of storage media in a cost effective way can be an important technological and competitive advantage.

Specific problems that need to be addressed include the best use of processing mechanisms such as data tiering and caching of storage objects (e.g., volumes [LUNs] and extents [sub-LUNs]), tuning and adjusting parameters such as cache and tier partition sizes and retention periods, choosing when to evaluate and trigger relevant policies, measuring the efficacy of a given configuration such as the SDD/HDD mix in a hybrid-storage system, etc., for workload(s) running on a system, and recommending changes if necessary, etc.

A technique is disclosed of machine learning (ML)-based clustering and profiling of data storage system workloads to gain relevant insights that can enable a spectrum of relevant optimizations. The following is a summary:

1. Using ML unsupervised learning methods, and in particular cluster analysis (also referred to as "clustering" herein), on workloads that are represented by compact IO traces, into a small set (e.g., 5-10) of clusters.
2. Evaluating clustering quality and choosing an optimal number of clusters.
3. Identifying the most prominent features of each cluster using an additional unsupervised learning (classification) step.
4. Analyzing the cluster classifications and generating a characteristic profile for each cluster.
5. Making operating adjustments, such as setting relevant policies for each cluster to improve system performance and utilization of the storage media and/or reduce related cost, by optimizing data placement decisions, tuning parameters etc.

The above steps can be done automatically or semi-automatically with expert advice. Examples herein illustrate the technique with representative real-life workloads. The technique is described in the context of a block storage system such as PowerMax™ or PowerStore™, but the technique is more broadly applicable to other types of storage systems including file and object stores, as well as to cloud environments, to optimize the placement and movement of workloads between different cloud storage service types.

EMBODIMENTS

Figure 1:
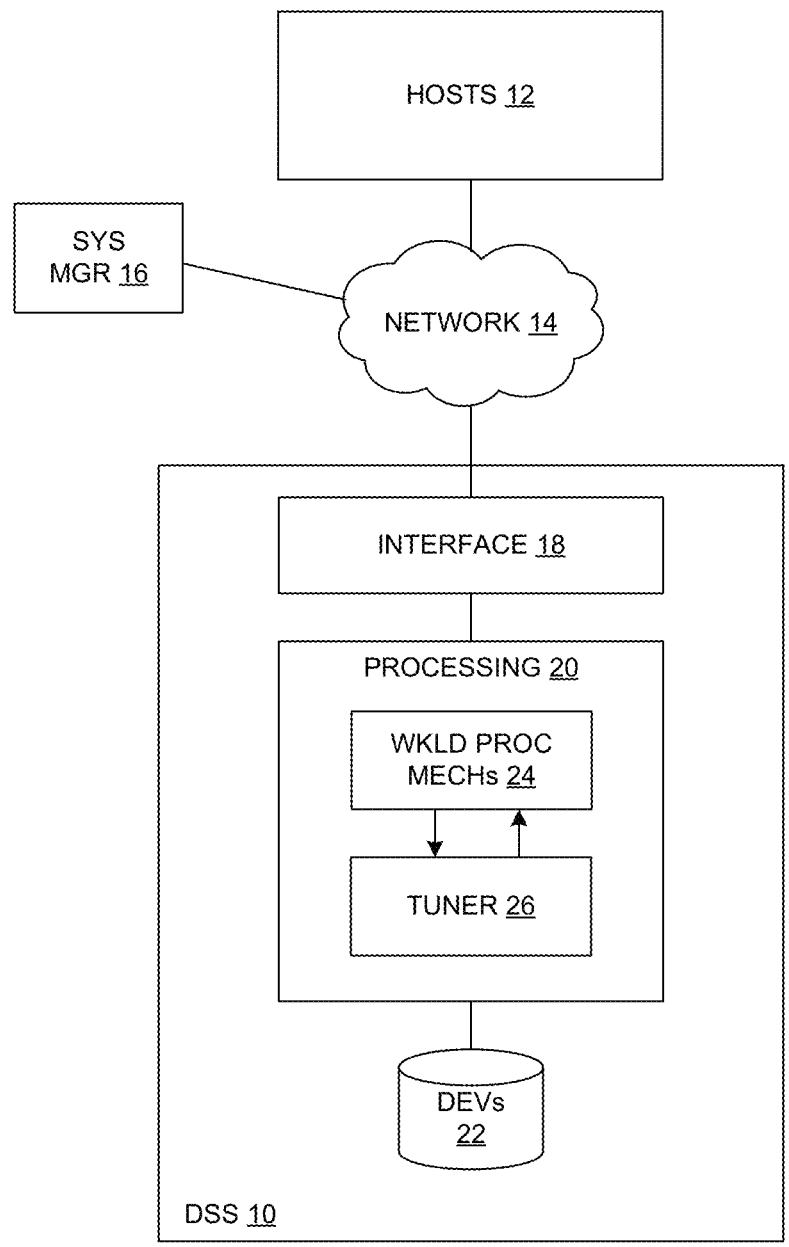
FIG. 1 is a block diagram of a data processing system having a data storage system performing cluster-based workload analysis and system tuning according to the present invention.

FIG. 1 shows a representative data processing system as including a data storage system (DSS) 10 and one or more host computers (hosts) 12 coupled to each other via a network 14. The system may also include a separate system management station (SYS MGR) 16. The DSS 10 is shown as including interface circuitry 18, processing circuitry 20, and physical data storage devices (DEVs) 22. As generally known, the processing circuitry 20 executes operating software that provides a variety of functionality of the data storage system 10, which at a high level is to use the devices 22 to store host data (writes) and return stored data on command of the hosts 12 (reads). The general data storage functionality is represented by a block of the processing circuitry 20 shown as workload processing mechanisms (WKLD PROC MECHs) 24. The processing circuitry also includes analysis and tuning circuitry shown as tuner 26, which (1) performs analysis as described herein based on data samples of data storage operations, and (2) performs automated adjusting of the workload processing mechanisms 24 based on the analysis results and performance and/or efficiency goals. Examples are described below that illustrate such operations.

In this description, "workload processing mechanisms" 24 refers to logical structure and functionality implemented by the processing circuitry 20 to realize a data storage system in its full complexity. As noted above, significant aspects of workload processing include caching and data tiering functionality. Caching can be adjusted in terms of size/capacity allocated for different volumes or classes of storage objects, for example, as well as by adjusting usage of faster and slower caching that may be available (e.g., DRAM cache versus Flash-based cache). Tiering refers to the usage of different classes/types of physical storage 22 in a hybrid storage system. Flash-based storage may provide higher performance at a certain cost and density, while disk-based storage may be of lower cost and higher density albeit with a potential performance disadvantage. There are myriad other aspects of the processing of workload operations that may be configurable or adjustable and thus can be included as workload processing mechanisms in a given embodiment.

Figure 2:
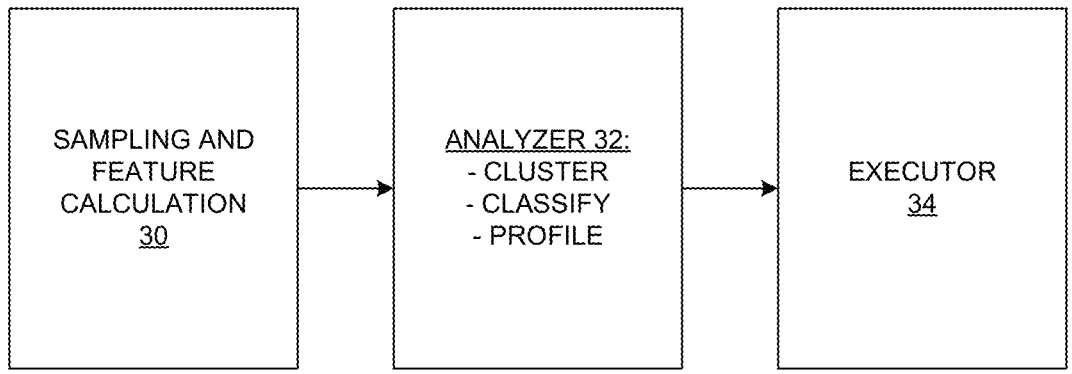
FIG. 2 is a block diagram of a tuning component realized by processing circuitry of the data storage system.

FIG. 2 shows structure of the tuner 26. It includes three major functional blocks, namely sampling and feature calculation 30, analyzer 32, and executor 34. As indicated, the analyzer performs three major functions, clustering, classifying, and profiling, based on features from the block 30 and as described in more detail below. The executor 34 operates to adjust or tune the data storage system based on workload profiles from the analyzer 32, as also described more below.

Figure 3:
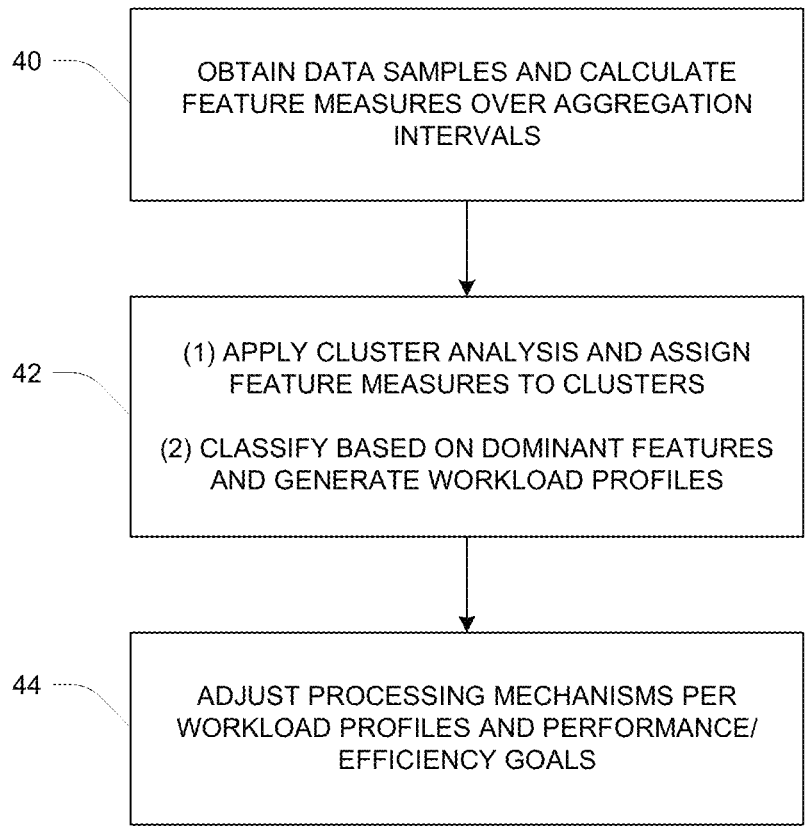
FIG. 3 is a high-level flow diagram of analysis and tuning operations.

FIG. 3 is a high-level flow diagram of operation of the tuner 26.

At 40, it obtains data samples for data storage operations of workloads presented by the hosts 12 and calculates feature measures for a predefined set of features of the data storage operations over a succession of aggregation intervals of an operating period. An example aggregation interval is 5 minutes. The operating period is generally defined by the period of use of a set of cluster definitions, i.e., the period in between successive operations of full cluster analysis as described further below. During an operating period, there is ongoing classification and profiling by the analyzer 32, as well as potentially multiple adjustments by executor 34. Also, there is preferably ongoing evaluation (by analyzer 32) of clustering quality as well as the quality of assigning data to clusters, and these evaluations can inform a need to "re-cluster", i.e., to perform a new cluster analysis and generate new cluster definitions. More generally, in different embodiments the operating period and/or adjustment intervals may be defined in various ways, e.g., constant or variable, configurable or fixed, and potentially adaptive to operating conditions.

At 42, during the operating period, the analyzer 32 (1) applies a cluster analysis to the feature measures from block 30 to define a set of clusters, and assigns the feature measures to the clusters, and (2) applies a classification analysis to the feature measures labelled by their respective clusters to identify one or more dominating features of each of the clusters, and generates workload profiles for the clusters based on their dominating features.

At 44, the executor 34 automatically adjusts one or more of the configurable processing mechanisms 24 (FIG. 1) based on the workload profiles from analyzer 30 and one or more performance or efficiency goals for the processing of the workloads by the data storage system. Several specific examples are given below to illustrate these operations.

The above refers to the assignment of feature measurements to clusters. If a cluster analysis is applied to an entire data set, then all data points become assigned to clusters by that analysis operation. In many cases it is possible, without unduly sacrificing accuracy, to perform the cluster analysis on a representative subset of data points, and then assign remaining data points to clusters based on some criteria (e.g., proximity). Such a technique has the advantage of greater processing efficiency, by avoiding a cluster analysis of an unnecessarily large data set. As an example, a well-selected 10% of a data set might produce sufficiently accurate clustering for the entire (100%) of the data set.

Below is an example description of operation data sampled by the sampling and feature calculation block 30. This initial data is obtained by sampling I/O traces and collected as part of normal operation of the DSS 10. This may be for all I/Os or some representative sample. The overhead of collecting such traces and aggregating them periodically, in terms of memory and CPU, is small relative to the overall system operation cost.

Per each relevant operation sent from the host 12 to the DSS 10 the following information is saved:
1. Host ID
2. Volume ID
3. Timestamp
4. Command (e.g., SCSI opcode, such as Read, Write, Copy, Unmap, etc.)
5. Logical block address (LBA—offset in the logical address space of the volume)
6. Length of I/O (for reads/writes, typically as a number of bytes)

The samples are used to aggregate counters for relevant features (as described below0) for each unit of clustering (also described below).

Unit of Clustering

Clustering can be applied to any relevant storage object such as a file, a stream, a volume (LUN) etc., or to smaller storage extents (aka sub-LUN or slice, meaning a large collection of blocks that exhibit a similar access pattern). It can also be applied to storage objects delineated by time intervals, e.g., every 5 minutes. In the latter case, heat maps can be used to track behavior changes in the storage object over time, such as changes in IO propensity, R/W mix, or locality. In the examples described herein, a storage volume is used as the clustering unit.

Features

Table 1 below presents an example list of features that can be used in clustering model. Other features may be used as well. Unlike other techniques that may use only aggregate counters, IO stream sampling herein can generate unique new features from the relationships between/among individual IO operations, such as the time or address difference between successive IOs. In the list below, all values are for each of an ongoing succession of aggregation intervals (e.g., every 5 minutes).

TABLE 1

Features

| Feature Name | Description |
| --- | --- |
| IOPS | Average IO rate (IOs per second) |
| Total Reads | Sum of read events |
| Total Writes | Sum of write events |
| Total Others (non-I/O) | Sum of all other events |
| Percentage reads (%) | % of reads events |
| Percentage writes (%) | % of write events |
| Percentage others (%) | % of other events |
| Average 'read' size | Average length of read IO |
| Average 'write' size | Average length of write IO |
| Std deviation of 'read' size | Standard deviation of read io length |
| Std deviation of 'write' size | Standard deviation of write IO length |
| Time consecutive I/Os (avg) | Average interarrival rate of IOs of any type |
| Time consecutive reads (avg) | Average interarrival rate of read IOs |
| Time consecutive writes (avg) | Average interarrival rate of write IOs |

TABLE 1-continued

Features

| Feature Name | Description |
| --- | --- |
| Delta consecutive I/Os (avg) | Average difference in LBA between IOs |
| Delta consecutive reads (avg) | Average difference in LBA between reads |
| Delta consecutive writes (avg) | Average difference in LBA between writes |
| Consecutive read-read (%) | % of consecutive IO pairs that are both reads |
| Consecutive read-write (%) | % of consecutive IO pairs that are read followed by write |
| Consecutive write-read (%) | % of consecutive IO pairs that are write followed by read |
| Consecutive write-write (%) | % of consecutive IO pairs that are both writes |
| Sequential read (%) | % of consecutive read pairs with 2nd read beginning at address where 1st read ended (i.e., LBA + size) |
| Sequential write (%) | % of consecutive write pairs with 2nd write beginning at address where the 1st write ended (i.e., LBA + size) |

It will be noted that the features are of several distinct types, including summing types (the "totals"), percentage types ("percentage"), size type, address type, timing type (interarrival times), and pattern types (consecutiveness, sequentiality). Different embodiments may employ different mixes of feature types, and of course different specific features within the distinct types, as may be needed for desired tailoring of system operation to different workload types.

The term "feature measurement" is used herein to refer to a specific calculated value for a feature of a stream of IO operations. For example, for a given stream the feature "% reads" may have a calculated value of 15%, which would be a specific feature measurement (or value) that is used in subsequent processing (cluster analysis, etc.).

Clustering Methods

Any of a variety of cluster analysis techniques may be used. Three example clustering algorithms are K-means, dbscan and hdbscan. K-means is centroid based, while dbscan and hdbscan are density based. K-means requires an initial setting of K (the number of clusters), which may be arrived at by performing repeated analyses with different values to find an optimal number (see below). dbscan and hdbscan require an initial setting of a factor epsilon (cluster "radius") and minimal cluster size. In some embodiments, hdbscan may be the best algorithm to use.

Measuring Clustering Quality

As mentioned, there is preferably ongoing evaluation of clustering quality, which refers to how well the calculated clusters correlate to the actual "clustering" (spatial distribution) of the data (feature measurements). Generally, data points within each cluster should be closer to other data points of the cluster than they are to data points of other clusters. A technique known as the "silhouette score" may be used to calculate both overall (i.e., inter-cluster) clustering quality, which measures how well are the clusters separated from each other, as well as individual cluster (i.e., intra-cluster) quality, which measures how "tight" or homogenous each cluster is. The silhouette score ranges from −1 to 1, where 1 means the clusters are clearly separated and −1 means the clusters are overlapping.

In the case of algorithms such as dbscan and hdbscan that explicitly identify "outliers" (points not assigned to any cluster), it can be useful to also track the number or % of such outliers. Note that K-means has no notion of outliers, although in some cases K-means may produce a cluster for a collection of data points that might be identified as outliers by other algorithms.

Number of Clusters

Figure 4:
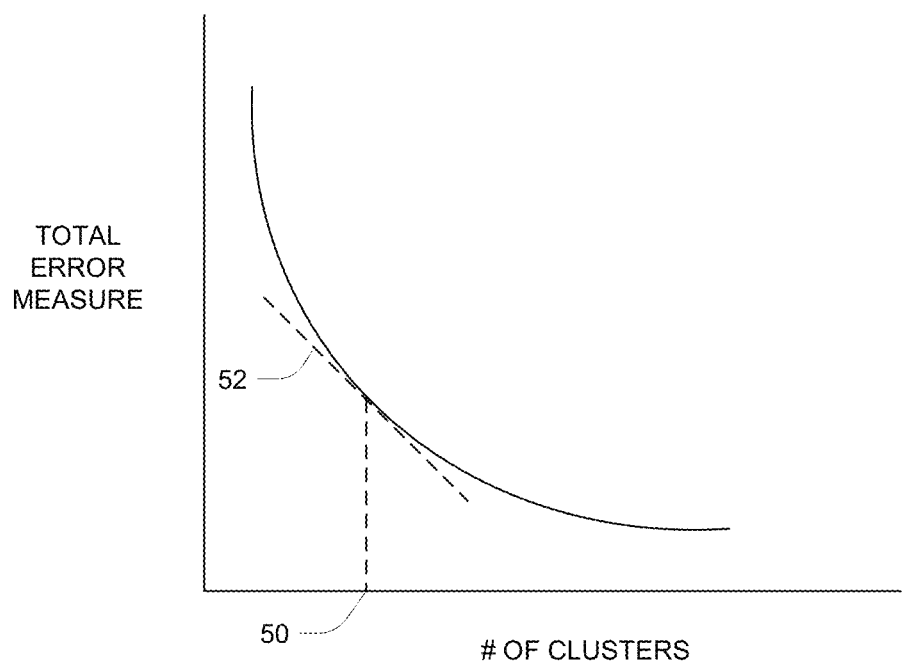

FIG. 4 illustrates a way to select a K value for K-means. The algorithm can be run multiple times using a representative data set and different values of K, and in each execution the total error (sum of data-to-centroid differences for all points of all clusters) is calculated. The sets of pairs (Error, K) for these trials have an inverse characteristic as shown in FIG. 4—higher error for fewer clusters, lower error for more clusters. A good value for K, indicated at 50, corresponds to the point at which this characteristic reaches some predefined slope 52 that corresponds to a point of diminishing returns (increasing the number of clusters does not yield proportionally greater accuracy). This can be compared with the number of clusters generated automatically by other algorithms such as hdb scan, which in the example below is 5.

Using the Silhouette Score

The silhouette score [−1, +1] is calculated for both inter-cluster and intra-cluster distances. The number of clusters is chosen that maximizes the score. In one example, with K-means this value is 6, while with dbscan it is 4 and with hdbscan. The following are also noted:

K-means has no definitions of outliers, while dbscan and hdbscan do. Outliers in dbscan or hdbscan may be viewed as a separate special cluster.

Methods may be combined. In the above example, 4 or 5 clusters+one for outliers may be chosen.

With more traces more clusters may be called for (e.g., 6-10)

The methodology can be automated

Calculating Feature Importance

Unsupervised learning itself does not provide a direct way to know the feature importance of a given cluster. Hence, a classification analysis is applied to the clustering results for this purpose. The data points (feature measurements) are processed using their assigned clusters as labels, and a binary classification (supervised) model is built (using the random forest algorithm, for example). The feature importance generated by the classification algorithm is used as the feature importance for the associated clusters.

Clustering Results—Most Prominent Features, Characteristics Per Cluster

Figure 5:
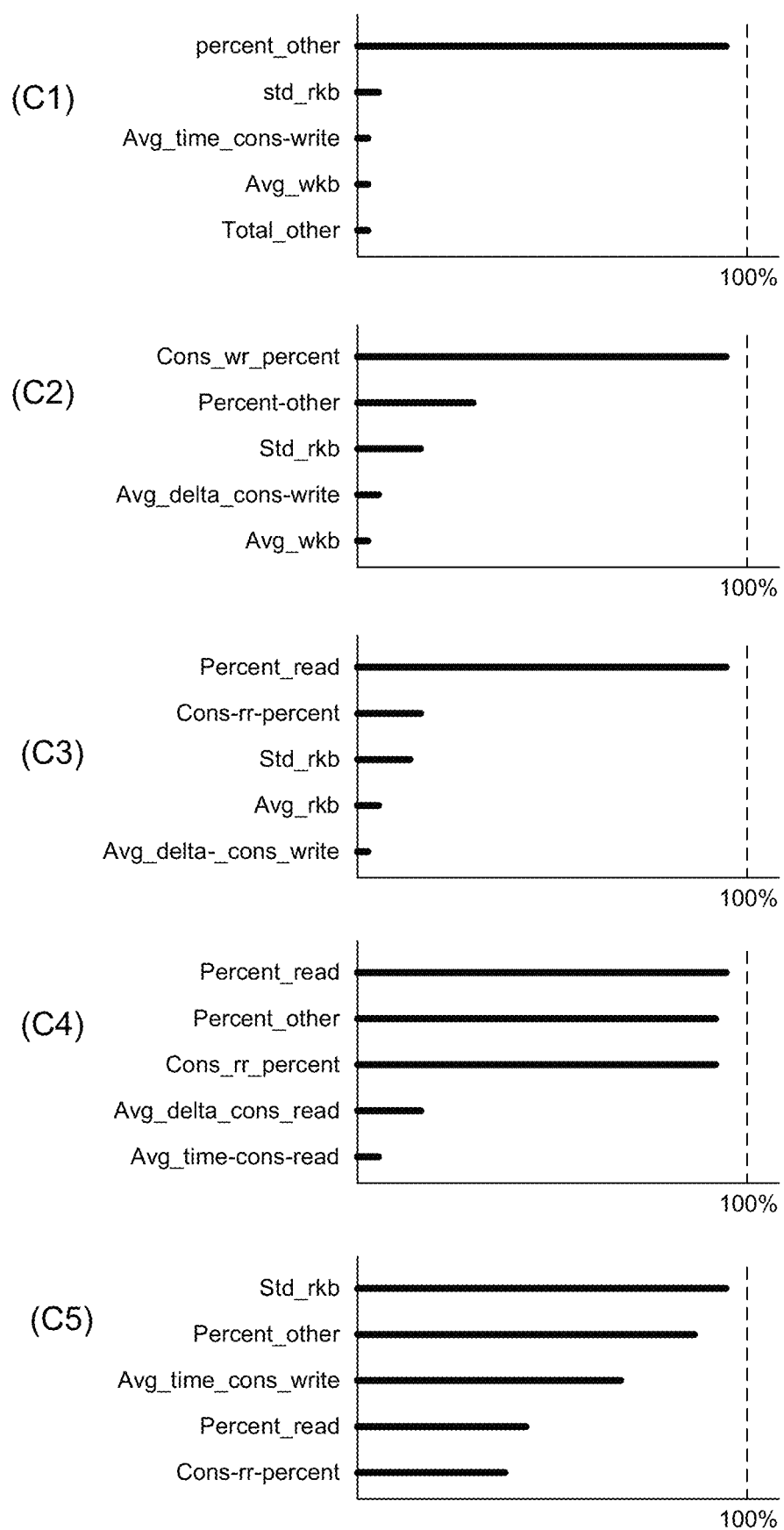
FIG. 5 is a set of plots showing dominating features of a set of clusters from a cluster analysis of workload features

FIG. 5 and Table 2 below present example clusters identified by the hdbscan algorithm along with their most prominent features and salient characteristics, which are given in a "profile" column of Table 2. FIG. 5 shows the five most prevalent or dominant features of each cluster (identified as C1-C5. The feature labels are shorthand references to the features of Table 1, e.g., "percent_other" is the "% of other events" from Table 1, etc. The horizontal axis is the prevalence (0 to 100%) of the feature in the cluster. The different patterns of dominant features in these clusters can be mapped to profiles such as given in Table 2. This mapping or profiling could be performed manually by a human or by a machine technique, e.g., a rules-based technique. Note that K-Means and dbscan would be expected to yield comparable results, and (as noted above) that a larger number of traces may result in a larger number of clusters (e.g., in the range of 5-10).

TABLE 2

Classification (feature importance) and cluster profile

| Cluster | Size (total 35k) | Profile |
|---|---|---|
| C1 | 8.5k | Idle volumes with no I/O<br>No reads/writes |
| C2 | 8k | I/O intense volumes<br>Random read locality<br>>60% consecutive writes<br>Moderate IOPs (business) |
| C3 | 5.5k | Read heavy<br>Moderate read locality<br>>90% consecutive reads<br>Minimal writes<br>Low IOPS (not active) |
| C4 | 3.1k | Reads <50%<br>Others >60%<br>Mixed read locality<br>No writes<br>Low IOPS (not active) |
| C5 | 9.3k | "Outliers" - scattered type, locality, consecutiveness, etc. |

Tuning/Adjustments

The following are example type of tunings or adjustments that can be made by the executor 34 based on the cluster-based profiling from analyzer 32 and performance/efficiency goals (explicit or implicit) for the data storage system 10.
1. Read heavy clusters
   Policy for such clusters could be to promote read-hot blocks into faster media (e.g., SSD) based read-cache in a hybrid system. There can be cost associated with promotion into such cache (e.g., SSD wear), but that cost may be amortized over multiple subsequent read-hits.
   Also, any writes for such clusters could be stream separated into their own segments and retained in Tier with good read performance characteristics.
2. Write heavy clusters
   Policy for such clusters could be to stream-separate writes into separate segments and delay garbage-collection process to allow the segment to self-clean.
3. Idle clusters
   Policy for such clusters could be to pack and down-tier their data to lowest-tier in the system.
4. Sequential reads
   Policy for such clusters could be to prefetch the data into cache especially if the data is on HDDs. Also, compression block size can be increased to improve data-reduction savings.
5. Sequential writes
   Policy for such clusters (in combination with some other characteristics) would be to stream separate and write directly to HDD tier.
6. Outliers
   Use default policy for this cluster. Keep track of % of outliers as an indication of clustering quality.

SUMMARY/OTHER

1. The initial and periodical clustering can be performed on the cloud to create generic model, or on the array to create specialized model for local workload. If a fixed re-clustering period is used, it may be about once per day for example.
2. Clusters are profiled by top features such as the R/W ratio, I/O size, random vs sequential etc.
3. A rule base can be used to associate optimization policies to clusters with well-known profiles.
4. New volumes are assigned to existing clusters (the nearest or best fitting cluster), while tracking assignment quality (average distance from selected cluster etc.).
5. There is periodic estimation of overall and cluster specific clustering quality and assignment quality, and % of outliers. This quality assessment period is of intermediate length, e.g., once per hour.
6. Upon deterioration beyond a preset threshold, recalculation of all cluster or some sub-set of clusters may be triggered. The threshold could be a self-referenced type, i.e., monitoring for large changes of quality measures or % outliers relative to recent longer-term averages. Policies are preferably reset for new/modified clusters While various embodiments of the invention have been particularly shown and described, it will be understood by those skilled in the art that various changes in form and details may be made therein without departing from the scope of the invention as defined by the appended claims.

What is claimed is:

1. A method of operating a data storage system having configurable processing mechanisms for processing data storage operations of a set of workloads, comprising:
   obtaining data samples for the data storage operations and calculating feature measures for a predefined set of features of the data storage operations over a succession of aggregation intervals of an operating period;
   during the operating period, (1) applying a cluster analysis to the feature measures to define a set of clusters, and assigning the feature measures to the clusters, and (2) applying a classification analysis to the feature measures labelled by their respective clusters to identify one or more dominating features of each of the clusters, and generating respective distinct cluster workload profiles for the clusters based on the dominating features thereof; and
   automatically adjusting one or more of the configurable processing mechanisms based on the cluster workload profiles and one or more performance or efficiency goals for the processing of the workloads by the data storage system.

2. The method of claim 1, wherein the configurable processing mechanisms include data tiering and caching of storage objects, the caching being adjusted in terms of size or capacity allocated for different storage objects, the data tiering being adjusted in terms of usage of different classes or types of physical storage for different storage objects.

3. The method of claim 1, wherein the operating period is defined by a period of use of the clusters as defined by the cluster analysis.

4. The method of claim 3, further including, during the operating period, ongoing classification and profiling of the feature measures and ongoing adjustments of the configurable processing mechanisms.

5. The method of claim 3, further including, during the operating period, ongoing evaluation of clustering quality and assignment quality for the assignment of the feature measures to the clusters, the ongoing evaluation being used to initiate a new cluster analysis and generate new cluster definitions based on deterioration of either or both the clustering quality and the assignment quality.

6. The method of claim 5, wherein the ongoing evaluation of clustering quality includes calculation of a silhouette score identifying how well the clusters are separated from each other and how homogenous each cluster is, the silhouette score ranging from a high value indicating clear cluster separation and a low value indicating cluster overlap.

7. The method of claim 1, wherein the cluster analysis is performed on a representative subset of a full set of feature measures, and remaining feature measures of the full set are assigned to the clusters based on a criterion.

8. The method of claim 1, wherein the data samples include, for each storage operation: host ID, volume ID, timestamp, command, address, and length.

9. The method of claim 1, wherein the analyses and adjusting are performed for storage objects managed by the data storage system and being the objects of the data storage operations.

10. The method of claim 9, wherein the storage objects are volumes.

11. The method of claim 1, wherein the set of features include features of distinct types including one or more a summing type, a percentage type, a size type, an address type, a timing type, and a pattern type.

12. The method of claim 1, wherein the cluster analysis is either centroid-based or density-based.

13. The method of claim 1, wherein the generating the cluster workload profiles includes applying a rules-based automated mapping to respective patterns of dominant features of the clusters.

14. The method of claim 1, wherein the adjusting includes one or more of (1) for read-heavy clusters, promoting read-hot blocks into faster storage media, (2) for write-heavy clusters, stream-separating writes into separate segments and delaying garbage collection to allow segments to self-clean, (3) for idle clusters, packing and down-tiering their data to a lowest tier, (4) for sequential-read clusters, applying a policy to prefetch data into cache and/or increasing compression block size to improve data-reduction savings, (5) for sequential-write clusters, stream-separating writes into separate segments and writing directly to a back-end tier, and (6) for clusters of outliers, applying default policy and tracking the relative number of outliers as an indication of clustering quality.

15. A data storage system having configurable processing mechanisms for processing data storage operations of a set of workloads, comprising:
interface circuitry for communicative coupling to a set of host computers generating the workloads;
physical storage providing back-end storage for data of the workloads; and
processing circuitry executing operating software to realize the configurable processing mechanisms and a tuner, the tuner being configured and operative to:
obtain data samples for the data storage operations and calculate feature measures for a predefined set of features of the data storage operations over a succession of aggregation intervals of an operating period;
during the operating period, (1) apply a cluster analysis to the feature measures to define a set of clusters, and assign the feature measures to the clusters, and (2) apply a classification analysis to the feature measures labelled by their respective clusters to identify one or more dominating features of each of the clusters, and generate respective distinct cluster workload profiles for the clusters based on the dominating features thereof; and
automatically adjust one or more of the configurable processing mechanisms based on the cluster workload profiles and one or more performance or efficiency goals for the processing of the workloads by the data storage system.

16. The data storage system of claim 15, wherein the configurable processing mechanisms include data tiering and caching of storage objects, the caching being adjusted in terms of size or capacity allocated for different storage objects, the data tiering being adjusted in terms of usage of different classes or types of physical storage for different storage objects.

17. The data storage system of claim 15, wherein the operating period is defined by a period of use of the clusters as defined by the cluster analysis.

18. The data storage system of claim 17, wherein the tuner is further configured and operative, during the operating period, to perform ongoing classification and profiling of the feature measures and ongoing adjustments of the configurable processing mechanisms.

19. The data storage system of claim 17, wherein the tuner is further configured and operative, during the operating period, to perform ongoing evaluation of clustering quality and assignment quality for the assignment of the feature measures to the clusters, the ongoing evaluation being used to initiate a new cluster analysis and generate new cluster definitions based on deterioration of either or both the clustering quality and the assignment quality.

20. The data storage system of claim 19, wherein the ongoing evaluation of clustering quality includes calculation of a silhouette score identifying how well the clusters are separated from each other and how homogenous each cluster is, the silhouette score ranging from a high value indicating clear cluster separation and a low value indicating cluster overlap.

21. The method of claim 1, wherein:
applying the classification analysis includes generating respective feature-prevalence patterns for the clusters, the feature-prevalence pattern for each cluster identifying a respective distinct set of most-prominent features of the respective cluster based on feature prevalence as indicated by the feature measures, the distinct sets being respective distinct subsets of the predefined set of features, and wherein generating the cluster workload profiles includes mapping the feature-prevalence patterns to respective ones of the cluster workload profiles.

22. The method of claim 21, wherein the predefined set of features includes an overall number m of features, and wherein each of the distinct sets of most-prominent features is a respective subset of size n, $n<m$, of the features based on prevalence in the respective cluster.

23. The method of claim 22, wherein the distinct sets of most-prominent features identified by the classification analysis have respective distinct collections of feature types and collectively make up a set of size p, $n<p<m$, of the overall number m of features.

* * * * *